Oct. 4, 1960   H. PLUMMER   2,954,668
BRAKE FOR JET AIRPLANE
Filed March 12, 1956   3 Sheets-Sheet 1
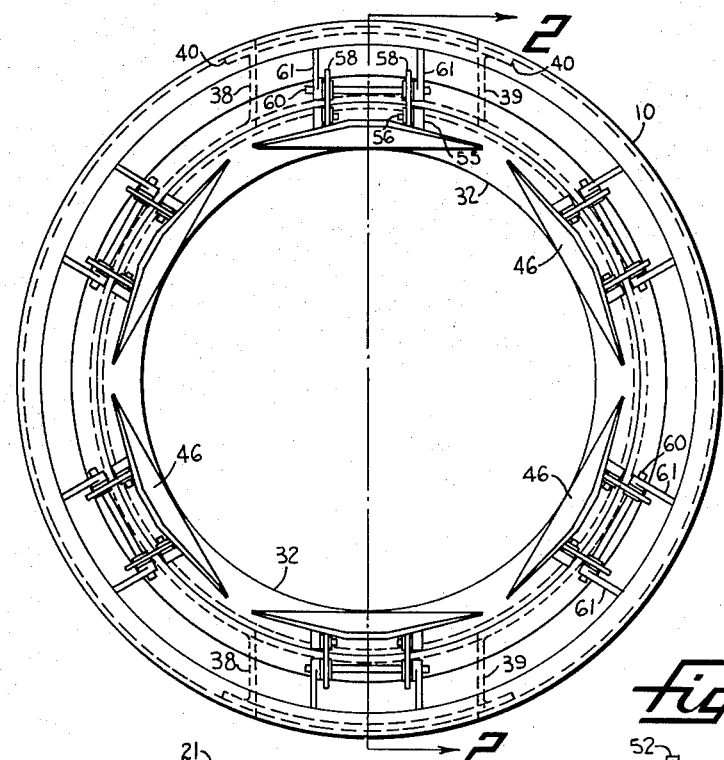
fig-1
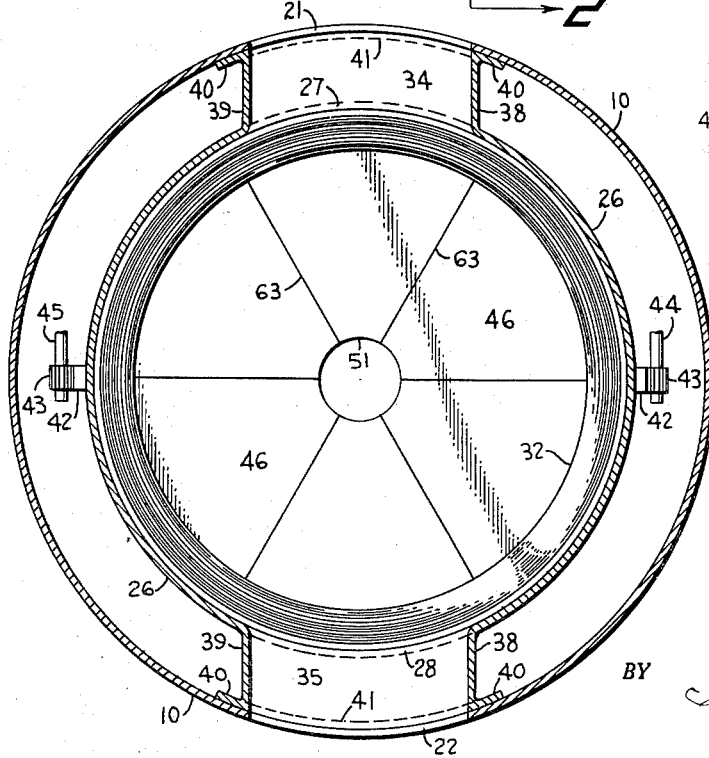
fig-5
fig-4
INVENTOR.
H. PLUMMER
BY
S. Tierney Jr.
ATTORNEY Oct. 4, 1960     H. PLUMMER     2,954,668
BRAKE FOR JET AIRPLANE
Filed March 12, 1956     3 Sheets-Sheet 2
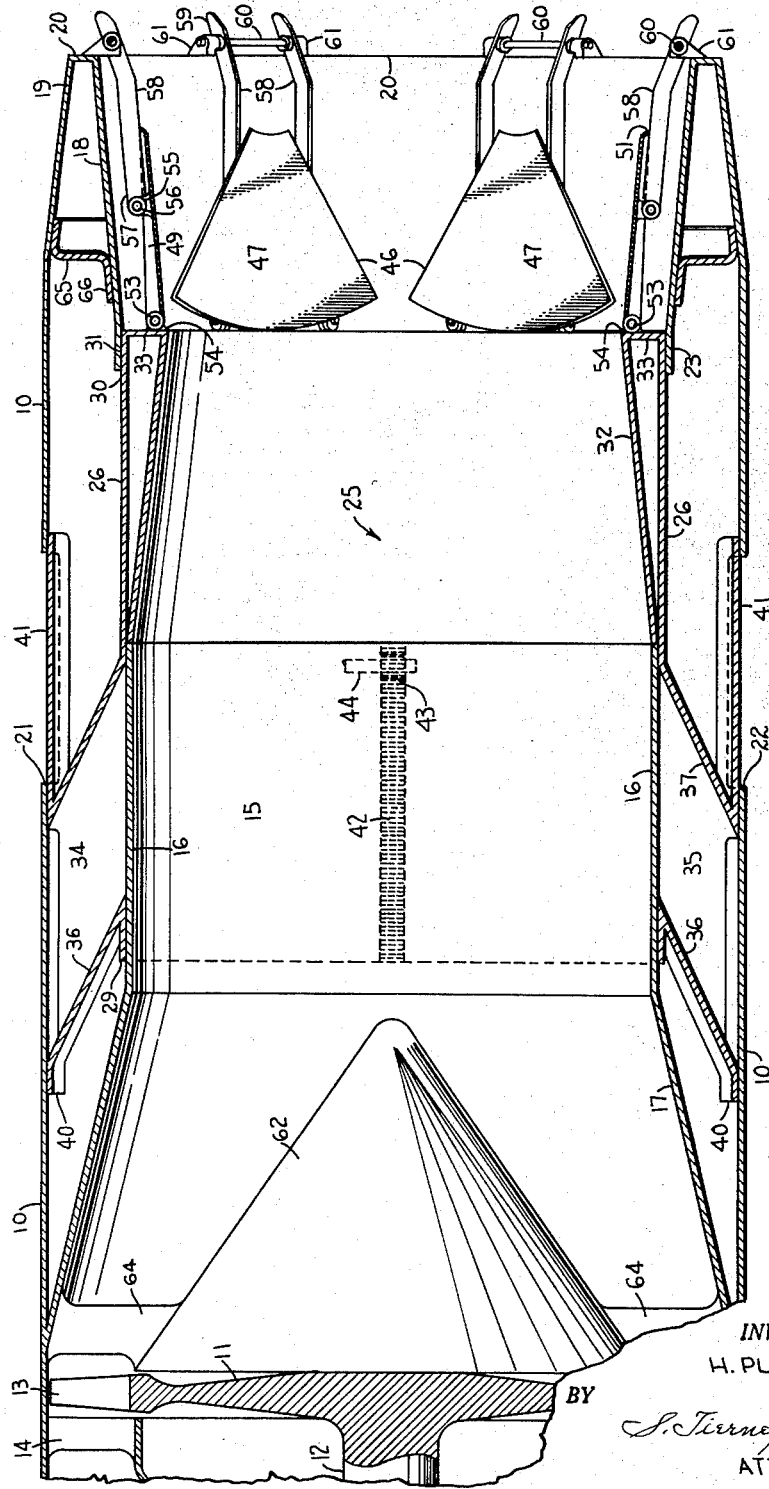
INVENTOR.
H. PLUMMER
BY
S. Tierney, Jr.
ATTORNEY

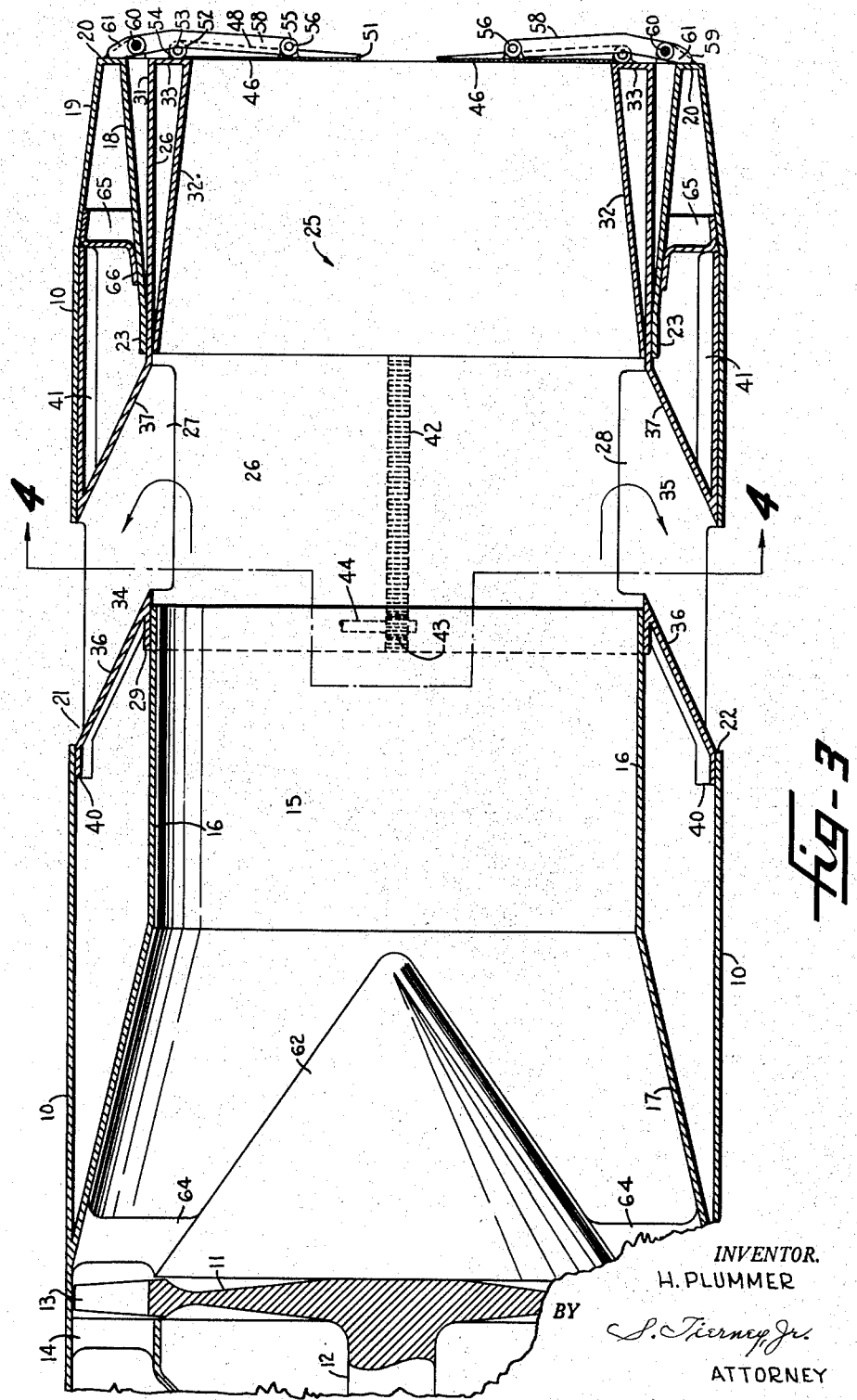

United States Patent Office 2,954,668
Patented Oct. 4, 1960

2,954,668

BRAKE FOR JET AIRPLANE

Harold Plummer, La Jolla, Calif., assignor to Rohr Aircraft Corporation, Chula Vista, Calif., a corporation of California Filed Mar. 12, 1956, Ser. No. 570,966

2 Claims. (Cl. 60—35.54)

This invention relates to a device for applying a braking action to a jet-propelled airplane to slow the plane down as it approaches a landing runway or is moving thereon.

In an airplane driven by the usual type of jet engine, the forward thrust of the airplane is due to a jet of hot gas passing in a rearward direction through the tailpipe connected to the outlet of the gas turbine. It is an object of my invention to change the direction of flow of a large portion of this exhaust gas so that it no longer exerts forward thrust but serves to slow down the airplane.

Another object is to provide one or more openings in the engine tailpipe to provide for the escape of the gas whose direction of flow has been changed and a movable control member slidable on and in the tailpipe and constructed to close said openings when the full forward thrust of the jet is desired.

A further object is to provide means at the downstream end of the tailpipe to reduce the effective flow area and the volume of gas discharged from the end of the pipe thereby reducing the forward thrust.

A still further object is to provide for this reduction of the flow area by means of a plurality of movable flaps which are supported so as to be out of the high velocity gas stream when the flaps are retracted to render the full flow area of the tailpiece effective to secure maximum forward thrust.

Other objects will become apparent as the description of my novel braking device proceeds. For a better understanding of the invention, reference is made to the accompanying drawings, in which:

Fig. 1 is a rear view of a jet engine tailpipe embodying the invention showing the control flaps in position for securing full forward thrust;

Fig. 2 is a longitudinal section of the tailpipe taken on line 2—2 of Fig. 1 also showing a portion of the gas turbine;

Fig. 3 is a longitudinal section similar to Fig. 2 but showing the control parts including the flaps in position for securing maximum braking effect;

Fig. 4 is a transverse section through the tailpipe taken on line 4—4 of Fig. 3, and Fig. 5 is a top view of the uppermost flap in Fig. 1.

A thin cylindrical metal tube 10 has mounted within it a turbine wheel 11 secured to the rear end of a rotary shaft 12, the wheel 11 having a plurality of spaced apart blades 13 against which the hot combustion gas from a combustion chamber of known type (not shown) located upstream from wheel 11 is directed by a set of circumferentially arranged stationary blades 14. The parts of the jet engine upstream from the blades 14 may be of conventional type and form no part of the present invention. Within tube 10 is a second tube or pipe 15 whose rear portion 16 is cylindrical and whose upstream portion 17 is frusto-conical, the upstream end of portion 17 being connected to tube 10 in any manner to prevent leakage. Downstream from tube 16 is an outwardly flaring frusto-conical tube 18 whose downstream end is connected to tube 10 by an annular ring 19 having a radial wall portion 20.

At the top and bottom tube 10 is provided with a pair of aligned discharge openings 21, 22 of large area each opening extending circumferentially for approximately 40 degrees.

An axially adjustable control member 25 is provided to cover the openings 21, 22 and direct the gas stream toward the downstream end of the tailpipe or to uncover said openings and direct the major portion of the stream forwardly thereby establishing a rearward thrust on the tailpipe and engine which slows down the airplane. Control member 25 comprises a cylindrical tube 26 of 360 degrees extent, this tube being provided with a pair of aligned openings 27, 28 of substantially the same area as openings 21, 22. The upstream end 29 of tube 26 contacts and slides along the outer face of cylindrical tube 16 and the downstream portion 30 of tube 26 contacts and slides along the inner face of cylindrical tube portion 23 which is integral with flaring tube 18. Attached to tube 26 is a frusto-conical tube 32 whose downstream end is connected to the end of tube 26 by a radially extending ring 33.

Attached to tube 26 are a pair of similar outlet ducts 34, 35 which convey the gas passing through openings 27, 28 forwardly and discharge it through the openings 21, 22 respectively. Each outlet duct comprises parallel front and rear walls 36, 37 inclined preferably at an angle of approximately 30° to the horizontal and vertical side walls 38, 39 (Fig. 1). The outer ends of the front and side walls are bent over to provide a short flange 40 whose outer face is cylindrical to contact and slide along the inner face of cylindrical tube 10. Each duct also has a rearwardly extending cylindrical plate 41 adapted to slide along the inner face of tube 10 to cover or uncover opening 21 or 22. Outlet ducts 34, 35 and cylindrical tube 26 are moved axially by means of a pair of horizontal racks 42 attached to the outside of cylindrical tube 26 and a pair of pinions 43. These pinions are secured to vertical drive shafts 44, 45 which are rotated simultaneously at the same speed in opposite directions by any suitable rotary drive means (not shown) controlled by the airplane pilot and preferably power operated. The rearward motion of control member 25 is limited by the cylindrical plates 41 coming against a ring 65 (Fig. 3), this ring having a wall 66 attached to tube 18.

In order to partially obstruct the flow of exhaust gas through the outlet of the tailpipe as control member 25 is moved rearward into braking position, a plurality of similar pivotally supported flaps 46 are provided, each flap comprising a sector shaped body portion 47 which is flat and provided on its rear face with a continuous reinforcing rib 48 having spaced apart parallel portions 49 which connect with inclined portions 50 (see Fig. 5) which extend along the edges of the flap. An arcuate rib portion 51 connects the inner ends of rib portions 50. A pair of bosses 52 are attached to the outer ends of rib portions 49, these bosses being bored to receive a long pivot pin 53 which also passes through a pair of bosses 54 secured to ring 33. Attached to rib portions 49 near the inner end thereof are a pair of lugs 55 each of which has an integral cylindrical pin 56. Pins 56 pass through the ends 57 of a pair of parallel links 58 which are shaped as shown in Figs. 2 and 3 to clear the pin 53. Inwardly of the end 59 thereof, each link is bored to receive a long pivot pin 60 which also passes through a pair of stationary lugs 61 attached to radial wall 20.

A stationary expansion cone 62 of known type is mounted in the upstream end of the tailpipe, being supported by a plurality of thin radially extending arms 64 whose outer ends are attached to tube 17. The hot gas from the turbine wheel 11 expands as it passes between cone 62 and tapered wall 17 into cylindrical tube 16. From tube 16 the gas passes through converging tube 32 which increases its velocity of flow to give increased forward thrust to the engine and airplane. It will be noted that the flaps 46 are now supported out of the moving gas stream and do not impede it so that full forward thrust is secured. As the airplane approaches a runway, and the pilot wants to apply braking action to slow it down, he rotates the shafts 44, 45 to move control member 25 rearwardly into the position shown in Fig. 3. In this position the radially extending edges 63 of adjacent flaps touch each other or come close together so that the flaps obstruct the flow of gas through the tailpipe. The pressure against each flap is taken up by pivot pin 53 and links 58 whose outer ends 59 become seated against radial wall 20 which acts as a stop. Also the outlet ducts 34, 35 are now in position to direct the major portion of the gas leaving the tailpipe in the reverse direction or toward a vertical plane passing through turbine wheel 11. This reversal in the direction of gas flow exerts a large thrust in the downstream direction on the tailpipe and engine, causing the airplane to slow down. While six flaps have been illustrated, it will be understood that a larger or lesser number may be used by correspondingly decreasing or increasing the angle between the radially extending edges 63 of each flap.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A gas engine tailpipe having a first long tube whose central portion is cylindrical and provided with at least two lateral openings of large area; a second cylindrical tube disposed within said tailpipe and having its downstream end disposed downstream from the upstream end of said openings; a tapered conduit connected to the upstream end of said second cylindrical tube to convey hot exhaust gas thereto; a hollow control member disposed entirely within said first tube and having spaced apart portions slidable along the inner cylindrical face of said first tube and the outer peripheral face of said second cylindrical tube, said control member having a plurality of thin metal ducts constructed to convey the major portion of the hot gas leaving said second cylindrical tube outwardly and forwardly into said openings, said control member having a plurality of cover plates in sliding contact with the central portion of said first tube and constructed in the upstream limit position of said control member to cover said openings; drive means operatively connected to said control member to move the control member between upstream and downstream limit positions; and means operatively connected to said first tube and to said control member to be moved by said control member into a position within the downstream end portion of said first tube adjacent the inner cylindrical face thereof and outside the gas jet leaving said control member when the control member moves into its upstream limit position and to be moved by said control member into a position to partially obstruct the flow of gas from the downstream end of said control member when the control member moves in its downstream limit position.

2. A gas engine tailpipe having a first long tube whose central portion is cylindrical and provided with at least two lateral openings of large area; a second cylindrical tube disposed within said tailpipe and having its downstream end disposed downstream from the upstream end of said openings; a tapered conduit connected to the upstream end of said second cylindrical tube to convey hot exhaust gas thereto; a hollow control member disposed entirely within said first tube and having spaced apart portions slidable along the inner cylindrical face of said first tube and the outer peripheral face of said second cylindrical tube; said control member having a plurality of thin metal ducts constructed to convey the major portion of the hot gas leaving said second cylindrical tube outwardly and forwardly into said openings; said control member having a plurality of cover plates in sliding contact with the central portion of said first tube and constructed in the upstream limit position of said control member to cover said openings; drive means operatively connected to said control member to move the control member between upstream and downstream limit positions; a plurality of pivots supported by the downstream end of said first tube; a plurality of links pivotally connected to said pivots; a plurality of sector shaped flaps having their upstream ends pivotally connected to the downstream end of said control member; a plurality of pivots connecting the upstream ends of said links to said flaps at points near the downstream ends thereof whereby said flaps are supported outside the gas jet leaving said control member in response to movement of said control member into its upstream limit position and the major portions of said flaps move inwardly to partially obstruct the flow of gas from the downstream end of said control member in response to the movement of said control member into its downstream limit position.

References Cited in the file of this patent

UNITED STATES PATENTS

| | | |
|---|---|---|
| 2,620,623 | Imbert | Dec. 9, 1952 |
| 2,780,058 | Beale et al. | Feb. 5, 1957 |

FOREIGN PATENTS

| | | |
|---|---|---|
| 56,672 | France | July 23, 1952 |
| | (First addition to No. 943,820) | |
| 1,092,654 | France | Nov. 10, 1954 |
| 860,754 | Germany | Dec. 22, 1952 |
| 740,385 | Great Britain | Nov. 9, 1955 |